Patented Aug. 22, 1933

UNITED STATES PATENT OFFICE 1,923,407

PROCESS OF RECOVERING GLASERITE

Henry Teynham Woodward, Berkeley, Calif., assignor to Burnham Chemical Company, Reno, Nev., a Corporation of Nevada No Drawing. Application August 21, 1929
Serial No. 387,567

4 Claims. (Cl. 23—40)

My invention relates to a method for obtaining from a brine, such as the complex brine found in various places throughout the world, particularly at Searles Lake, California, or from artificial brines, the complex crystal salt, potassium sodium sulphate, $K_3Na(SO_4)_2$, which is sometimes called glaserite.

The brines referred to are usually of a very complex nature, containing sodium and potassium, chloride, sulphate, carbonate, bicarbonate and borate ions. The recovery of a salt composed of any of these various ions is thus particularly difficult, due partly to the fact that the salts formed by the combination of the other ions contained in the brine have solubility characteristics closely resembling each other. As I have disclosed in my copending application, Serial No. 332,463, filed Jan. 14, 1929, the recovery of glaserite is particularly complicated by the precipitation of sodium tetraborate, sodium chloride and the complex salt, sodium carbonate sulphate, known as burnhamite. Efforts to purify glaserite by washing out the impurities present have not been feasible, the impurities with the exception of sodium chloride are usually less soluble than the glaserite, and, accordingly, the wash water removes more glaserite than impurities.

Efforts to purify the glaserite by recrystallization have not been successful because the relative solubilities of the several salts present as impurities are so nearly the same as that of the glaserite that, under ordinary conditions, precipitation of the glaserite occurs with various quantities of the other salts present as impurities.

It is an object of my invention to facilitate the recovery of potassium sodium sulphate in a pure condition.

Another object of my invention is to decrease the quantity of impurities retained in the recovered glaserite.

A further object of my invention is to increase the yield of potassium sodium sulphate obtained from a brine.

My invention possesses other advantageous features some of which with the foregoing will be set forth at length in the following description where I shall outline in full the preferred process of my invention which I have selected for the purpose of description. I shall describe the process as applied to the brine of Searles Lake, California, but it is to be understood that the process of my invention is not to be limited except within the scope of the claims.

In accordance with the preferred form of my process, as I have practiced it at Searles Lake, the brine is first drawn from a well and pumped into a suitable concentration pond, in which it is subjected to evaporation to increase the concentration of the brine. The natural weather conditions existing at Searles Lake are particularly favorable to the use of natural temperatures in following the process of my invention. Thus I preferably effect the concentration of the brine by means of solar evaporation. However, I may use artificial means for securing the desired alterations of the solution.

The brine is usually concentrated, when it is desired to recover glaserite, to remove certain of the undesirable salts which are present in solution. When the concentration of the glaserite in the brine is supersaturated or is approaching that state of supersaturation, the brine is pumped into other ponds wherein the precipitation of glaserite occurs. I usually effect this concentration and precipitation of glaserite in a series of ponds, the brine being processed until the concentration of glaserite in the solution is relatively small. The precipitated glaserite is collected and stored for further processing.

The recovered crystallized potassium sodium sulphate, precipitated in the presence of a relatively high concentration of other salts is consequently not in a pure state. The most difficult impurity to wash out of, or to remove from the glaserite is usually borax. I have found that the addition of an alkali to the wash water increases the solubility of the borax and permits the ready purification of the glaserite.

The marked contrast between the difficulty with which borax is removed as an impurity from glaserite and the ease with which another impurity, such as sodium chloride, may be removed is brought out in the following example. I have found that if 200 grams of glaserite containing 17.45%, or 34.9 grams of sodium chloride as the sole impurity is agitated with 100 grams of water at 25 degrees centigrade until equilibrium is established substantially all the sodium chloride and only about 12.3 grams of glaserite will be dissolved. This results in a yield of substantially 151.8 grams of substantially pure glaserite. However, when a 200 gram sample of a crude glaserite crystal mixture containing borax and having the following composition:

| | Percent |
|---|---|
| Glaserite | 46.4 |
| Sodium chloride | 15.4 |
| Borax | 36.5 |
| Sodium sulphate | 1.8 |
| | 100.0 | is similarly agitated with 100 grams of water, I have obtained substantially 132.8 grams of impure glaserite of the following composition:

| | Percent |
|---|---|
| Glaserite | 69.4 |
| Borax | 30.4 |
| | 99.8 |

While the sodium chloride and sodium sulphate have been removed, the percentage of borax present is very high, being sufficient to render the glaserite worthless as a fertilizer, which is its ordinary commercial use. More water must be used to wash it from the glaserite and this will accordingly entail a further loss of the desired salt for it is more readily soluble than the borax. The final yield of glaserite is necessarily low when it is thus processed in the presence of borax.

I have found the addition of a strong alkali to the wash solution increases the solubility of the borax by approximately 100 grams per equivalent of alkali added and, further, that the solubility of borax is increased by the addition of an alkali to approximately 50.8 grams per liter of water in solutions saturated with sodium chloride and glaserite at 20° C., while the solubilities of the other salts usually present are substantially unchanged.

I have also found that the washing of the crude glaserite crystals with a solution containing free caustic, or having a suitable pH value, or hydrogen ion concentration, decreases the loss of glaserite in the wash solution, and the glaserite crystals obtained are, relatively, a purer product. While the exact quantity of the alkali added to the wash water for the crude salt depends upon the kind and quantity of the impurities present, I have found that about 8 percent by volume of the usual 50 percent commercial sodium hydroxide may be expediently employed with one sample of crude glaserite from Searles Lake brine. The exact quantity of the alkali added is easily determined in accordance with the nature and the percentages of the several impurities present and with the particular alkali employed.

While I have mentioned the use of sodium hydroxide as being the preferred alkali, the undesirable impurities can be removed from the glaserite crystals by the use of other alkalis such as potassium hydroxide, with a marked degree of success. The criterion of the alkali to be used is, generally, that the water solubility of the salt, considered to be present as impurity, should be increased by the addition of the alkali. The pH value of the wash water solution, which can be used successfully, is about 11 or greater.

In case sodium carbonate is present as an impurity, it may be expedient to add calcium oxide as the alkali. The following reaction then occurs, I believe,—

$$CaO + H_2O + Na_2CO_3 = CaCO_3 + 2NaOH$$

The calcium carbonate precipitates as an impurity which, in some cases, is not objectionable. The sodium hydroxide formed increases the alkalinity of the wash solution and dissolves the borax as previously pointed out.

To carry out my process in the preferred manner, I preferably withdraw the crude glaserite from storage and suitably contact it with the desired quantity of the alkaline wash water. This may be expediently accomplished in an agitator. I have found, with a sample of crude glaserite crystals obtained from Searles Lake brine under operating conditions, that two hours' agitation is a sufficient length of time for contact of the alkali on the crystals. This time however may be more or less depending upon the particular glaserite crystals and the conditions of operation. The process readily lends itself to either batch or continuous operation.

In some instances I have found it advantageous to reduce the initial high concentration of impurities present, such as sodium chloride, by washing the crude glaserite, previous to agitation with the alkaline solution, with water. This serves to reduce the final quantity of water required to wash the glaserite, and increases the solubility of the borax.

The agitation of the crude glaserite with the alkaline solution may be repeated a number of times to secure the final purification of the glaserite. The wash liquor is drawn off from the glaserite to be used in other processes.

I claim:

1. A method of recovering glaserite from Searles Lake brine comprising recovering said brine, concentrating said brine, recovering crude glaserite crystals from said concentrated brine, treating said crude glaserite with dilute sodium hydroxide, and recovering said treated glaserite crystals.

2. The method of purifying crude glaserite crystals containing an impurity comprising mixing said crude glaserite crystals with an alkaline water to dissolve said impurity.

3. The method of purifying crude glaserite crystals containing borax impurity comprising mixing said crude glaserite crystals with an alkaline water to dissolve substantially said impurity.

4. The step in the method of purifying a crude glaserite crystal mixture containing borax as an impurity comprising washing the borax substantially out of the crystal mixture with an alkaline wash water.

HENRY TEYNHAM WOODWARD.